No. 876,437. PATENTED JAN. 14, 1908.
G. C. CARSON.
GAS CONVERTING PROCESS.
APPLICATION FILED JUNE 18, 1906.
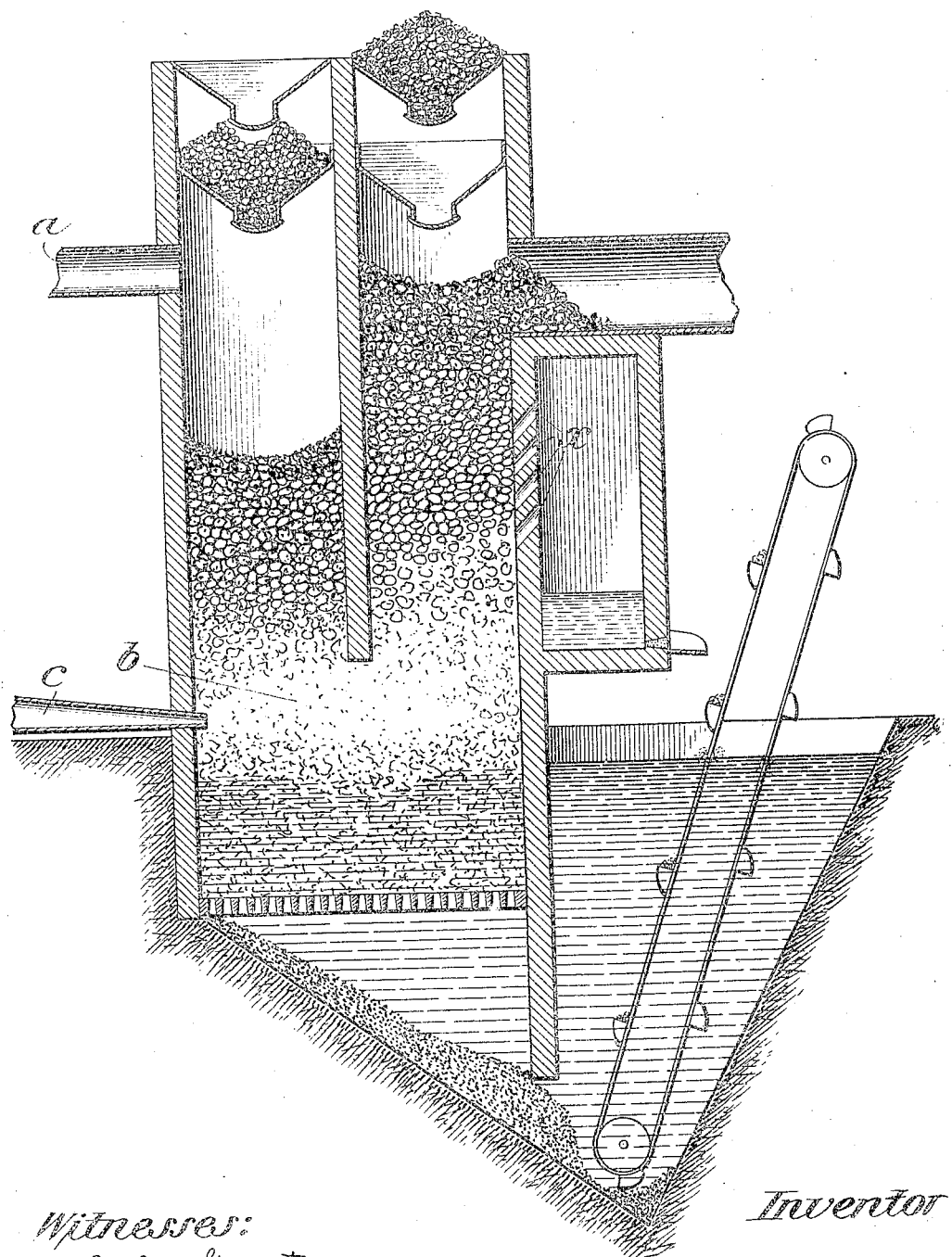
Witnesses:
Ed. W. Grant
D. R. McLaws
Inventor
George Campbell Carson

UNITED STATES PATENT OFFICE.

GEORGE CAMPBELL CARSON, OF DENVER, COLORADO.

GAS-CONVERTING PROCESS.

No. 876,437.

Specification of Letters Patent.

Patented Jan. 14, 1908.

Application filed June 18, 1906. Serial No. 322,235.

*To all whom it may concern:*

Be it known that I, GEORGE CAMPBELL CARSON, a citizen of the United States, who resides at the New Broadway Hotel, Denver, Colorado, have invented certain new and useful improvements in preventing the escape of deleterious gases into the atmosphere, as well as recovering large losses which are made by smelters and other furnaces by allowing metallic oxids and other products of combustion to escape without treatment and recovering the combusted elements therein.

My invention relates to a process of treating oxids of metals and metalloids such as $CO_2$, $SO_2$, $As_2O_3$, $PbO$, $ZnO$, $FeO$ and $Fe_2O_3$, by bringing them into contact with heated carbon whereby the oxids are reduced and carbon monoxid formed.

I will illustrate my process by the following illustration, which are the reactions that take place with all of the above named compounds excepting sulfur, which I will explain separately.

A bed or body of carbon is so arranged in two separate chambers, or in one elongated chamber, that when carbon is fed from either end or side it will concentrate to a central point, where a high temperature is maintained, and the ashes from the consumed carbon, as well as the metals reduced from their oxids will fall into a body of water, and the gasified elements, such as arsenic, sulfur, or other elements which have given up their oxygen to the burning carbon, can escape through chambers or niches in the walls and condense in separate chambers, compartments, or be stored in reservoirs.

In splitting the molecule of $CO_2$ into 2CO the process described below is followed.

The gas, $CO_2$, or other gaseous oxids, is maintained under sufficient pressure to drive it through the body of carbon, or else sufficient vacuum is maintained to draw it through. I will assume that it is desired to convert an atmosphere saturated with $CO_2$ into an atmosphere of CO. Thus:—One unit of carbon combines with 2.66 units of oxygen, which, if taken from the atmosphere, will be mechanically mixed with 8.9 units of nitrogen, which will be 12.86 units of $CO_2+N$ atmosphere. This 12.56 units of $CO_2+N$ atmosphere, if heated to 833° centigrade in the presence of carbon heated to the same temperature will give up 1.33 units of oxygen to the carbon which is added to the gas, making an atmosphere of 13.56 units of $CO+N$ at a temperature of 833° centigrade, or all told, 11295.5° centigrade in the 13.56 units. There will be 2407° of this heat generated by the reaction of the 1.33 units of oxygen in the gas combining with the one unit of carbon, which is deducted from 11295.5, leaving 8888.5° to bring about the reaction.

If the gas was allowed to escape with this heat it would require the burning of an immense amount of carbon at the point of high temperature to supply the heat being carried away with the escaping gas; but this heat is arrested by so charging cold carbon that the gas in passing through it as it escapes into the gas main, will give up its heat to the cold carbon, which in turn will descend to the zone of high temperature, and be available for bringing about the subsequent reaction of succeeding units of gas.

If the atmosphere of 13.56 units of $CO+N$ escapes from the cold carbon at a reduced temperature of say 200°, which would be 2712° of lost heat, from which should be deducted the heat liberated by the reaction of the unit of carbon and 1.33 units of oxygen in the zone of high temperature, there would remain 305° to be liberated by burning initial carbon with oxygen other than that of the reaction; there would also be imparted to the cold carbon 8593.5° which is available for maintaining the high temperature necessary to create the reaction; and if enough cold carbon is carried in stock to cool the escaping gas to the same temperature as the incoming gas then it will not be necessary to burn any carbon at the point of high temperature, providing none of the heat of the escaping gas is dissipated by evaporating or distilling volatile compounds from the cold carbon. But owing to the fact that coal or other carboniferous matter is cheaper than coke or charcoal, it is best to place a twyer or twyers so that a blast of air can be charged into the zone of high temperature, and sufficient carbon burned to distil or expel all of the gases and water in the cold carbon being charged.

There will be a large gain in heat by reconverting smoke into CO, for when $CO_2$ loses one atom of oxygen the carbon of the smoke then exists as CO which contains 5673 heat units, and the atom of oxygen which left the $CO_2$ and combined with an atom of carbon in the incandescent zone, produces another molecule of CO containing another heat value of 5673, making all told in the two molecules of CO a value of 11346 against 8080, which would have been available if the carbon used in splitting up the $CO_2$ had been burned direct to $CO_2$, or a saving of 29 per cent. in heat is effected.

The oxids of lead, zinc and iron, in fact, all flue dust and gases from smelting furnaces, give up their oxygen in passing through incandescent carbon, and are reduced so that they will be recovered in the ash of the consumed carbon and condensing chambers.

I will further explain this process by referring to the accompanying drawing, which is a suitable apparatus for carrying on this process.

The smoke or gases containing the oxids to be treated enter a chamber at "$a$," which is supplied with cold carbon, which is charged in any way to prevent the escape of gas while charging, and are forced down through a bed of cold carbon into the incandescent zone shown at "$b$," which has been created by forcing a blast of air into kindled carbon through the twyer "$c$." Here the following reactions take place:

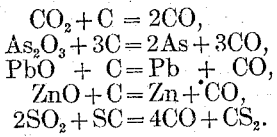

$$CO_2 + C = 2CO,$$
$$As_2O_3 + 3C = 2As + 3CO,$$
$$PbO + C = Pb + CO,$$
$$ZnO + C = Zn + CO,$$
$$2SO_2 + 5C = 4CO + CS_2.$$

The molecule of $CS_2$ is formed on the outer edge of the incandescent zone where the carbon is at a low red heat, but it is broken up into C+S as it enters the zone of high temperature, carbon being deposited and sulfur vaporized as the gases pass through the zone of high temperature. All of the elements reduced from the gases as they pass through the zone of high temperature, which fall into the ash of the consumed carbon, are washed through the grate bars with the ash by giving the water which is used for a seal a jig motion and are collected at the bottom of the pit beneath the apparatus, and can be removed for further treatment in the most convenient way.

A part of the elements accompanying the gas will be heated so high above their boiling points that they will be vapors, and will ascend with the gas in the second chamber through the cold carbon until they reach their condensing point, where the gas is cooled enough to allow them to condense by the cold carbon. At this point niches will be made in the walls of the second chamber to allow these vaporized elements to escape into a condensing chamber and condense. The CO and nitrogen will continue on up through the cold carbon and into the lead to the gas mains or reservoirs, where it is available for heating or lighting.

The carbon must be charged into the second chamber so as to prevent the escape of gas, and sufficient carried in stock through which the gas courses, to cool the gas to the lowest possible temperature, and in such a manner that it will descend to replace the carbon consumed in the zone of high temperature. The weight of the water used to seal the converter must be greater than the pressure of the gases in the chambers, so as to prevent the escape of gas; and the walls, as well as the charging apparatus, must prevent leakage of gas.

This process will not alone prevent the destruction of vegetation in the vicinity of smelting plants, but it will also prevent the smoke nuisance in cities and manufacturing communities. If tunnels are driven underneath the surface, and all smoke turned into such tunnels it could be drawn to stations where the unconsumed carbon could be burned and the $CO_2$ converted into 2CO and used again.

I am aware that none of these reactions are new, and that other inventors have tried to do what this process does, but have failed, owing to the fact that they let their converted gas escape without resquing the heat that was being carried away, and the cost of fuel to maintain a temperature to break up the gas molecules and reform the oxygen into CO makes them prohibitive.

Many different designs of apparatus can be made for carrying on this process. Thus the blast furnace used in smelting iron ore would make an ideal receptacle for holding the carbon, provided the gases to be treated were driven in through the twyers as is now done with the air. Also the pit beneath the incandescent zone can be made very deep so that the ash from the consumed carbon can be removed from the bottom thereof at the rate which combustion supplies ash, and the water used as a seal for the bottom of the covering receptacle dispensed with, as well as the grates to support the bed or body of carbon. Any chamber with a partition which will form a bridge over the incandescent zone, underneath which the current of gas can pass, and which will separate the converted from the non-converted gas, will do for a converting chamber. The point which makes the process operative is absorbing the heat carried away in the converted gas into carbon which is used to replace the carbon consumed in the incandescent zone.

On the right side of the drawing is shown a condensing chamber with open parts, $x. x. x. x.$ opening into the converting chamber. These parts are placed in the wall where there is sufficient heat in the carbon to gasify sulfur and arsenic, but just below that point where these metalloids condense. What sulfur and arsenic pass through the ports will condense within the chamber, and that which condenses on the cold carbon above will return with the carbon to a temperature where it will be gasified again and ultimately pass through the ports into the condensing chamber, where it will condense, and can be tapped into molds at regular intervals. There will also be considerable sulfur separate with the ash of the carbon, and be recovered from the pit beneath the converter with the ash.

Having fully described my process, which I claim as new and desire to secure by Letters Patent is:—

1. The process herein described of creating and maintaining a zone of high temperature within a bed or body of cold carbon with a blast of air forcing or drawing a current of smoke or flue dust from smelting or other furnaces through said body of cold carbon into said zone of high temperature, converting the metallic oxids in said smoke or flue dust into metals and carbon monoxid, with the reaction between said oxids and said carbon converting the non-metallic oxids in said smoke or flue dust into metalloids and carbon monoxid, with the reaction between said oxids and said carbon allowing the metals reduced from said smoke or flue dust to settle with the ash into a body of water, allowing the gas to pass from said zone and pass through cold carbon, absorbing the heat from said gas with said cold carbon, maintaining said cold carbon by continuously charging fresh carbon to said bed or body of carbon, allowing metalloids to pass from said body of carbon into adjacent condensing chambers substantially as described.

2. The process herein described of maintaining a body or bed of carbon with a central zone of high temperature, forcing or drawing gases containing metalloids or metallic fumes through said bed or body of carbon and zone of high temperature, converting said gases into carbon monoxid, and cooling said carbon monoxid by leaving the heat of said carbon monoxid in cool carbon or outer zone of said bed or body of carbon, reducing metals and metalloids from said gas, allowing said metalloids to pass through ports or opening in walls surrounding said bed or body of carbon, into condensing chambers, allowing said metals to settle with ash of consumed carbon from said body or bed into water, giving said water a jig motion, and washing said metals and ash into a pit beneath said body or bed of carbon, removing said metals and ash from said pit, substantially as described.

3. The process herein described of passing a current of gas and flue dust through a bed or body of incandescent carbon, reducing metals and metalloids from said gas and flue dust, collecting said metals and metalloids in the ash from said incandescent carbon and in condensing chambers, cooling said current of gas by passing it through cold carbon, which replaces consumed carbon in said incandescent zone, replenishing the consumed carbon of said incandescent zone with carbon heated by the current of gas leaving said incandescent zone, substantially as described.

GEO. CAMPBELL CARSON.

Witnesses:
  Wm. V. Wright,
  M. C. McClary.